United States Patent

Esser et al.

(10) Patent No.: US 9,527,526 B2
(45) Date of Patent: Dec. 27, 2016

(54) STEERING SYSTEM FOR A MOTOR VEHICLE AND METHOD FOR OPERATING SAME

(71) Applicant: Ford Global Technologies, LLC, Dearborn, MI (US)

(72) Inventors: Frank Esser, Kerpen (DE); Joerg Peter Schalz, North Rhine-Westphalia (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/059,399

(22) Filed: Mar. 3, 2016

(65) Prior Publication Data

US 2016/0257339 A1  Sep. 8, 2016

(30) Foreign Application Priority Data

Mar. 4, 2015 (DE) ........................ 10 2015 203 864

(51) Int. Cl.
*B62D 6/08* (2006.01)

(52) U.S. Cl.
CPC ..................... *B62D 6/08* (2013.01)

(58) Field of Classification Search
CPC ....................................... B62D 6/08
USPC ........................................... 701/41
See application file for complete search history.

(56) References Cited

U.S. PATENT DOCUMENTS

| 4,574,905 A | 3/1986 | Asano et al. |
| 4,687,216 A | 8/1987 | Kawamoto et al. |
| 4,705,135 A | 11/1987 | Kawamoto et al. |
| 4,914,592 A | 4/1990 | Callahan et al. |
| 7,216,024 B1* | 5/2007 | Abels .................. B60T 8/241 340/685 |
| 2005/0263338 A1 | 12/2005 | Turner et al. |
| 2007/0185638 A1* | 8/2007 | Odenthal ............ B60T 8/17555 701/70 |
| 2010/0106356 A1* | 4/2010 | Trepagnier ............ G01S 17/023 701/25 |
| 2010/0241314 A1* | 9/2010 | Bohm .................... B62D 7/159 701/41 |
| 2012/0303218 A1* | 11/2012 | Tamura .................. B62D 1/02 701/41 |
| 2016/0257339 A1* | 9/2016 | Esser ...................... B62D 6/08 |

FOREIGN PATENT DOCUMENTS

| DE | 10346146 A1 | 5/2004 |
| DE | 102005012647 A1 | 12/2005 |
| DE | 102005056462 A1 | 5/2007 |
| JP | 2009056887 A | 3/2009 |

* cited by examiner

*Primary Examiner* — McDieunel Marc
*Assistant Examiner* — James E Stroud
(74) *Attorney, Agent, or Firm* — Burgess Law Office, PLLC; Raymond I. Coppiellie

(57) ABSTRACT

A method operates a steering system of a motor vehicle having a steerable wheel controlled using a steering wheel. The method begins by ascertaining a prevailing control angle of the steering wheel of the motor vehicle. A variable steering ratio between the prevailing control angle and a steering angle of the steerable wheel is defined. A static steering ratio from the variable steering ratio to set the steering angle of the steerable wheel is then selected.

13 Claims, 2 Drawing Sheets

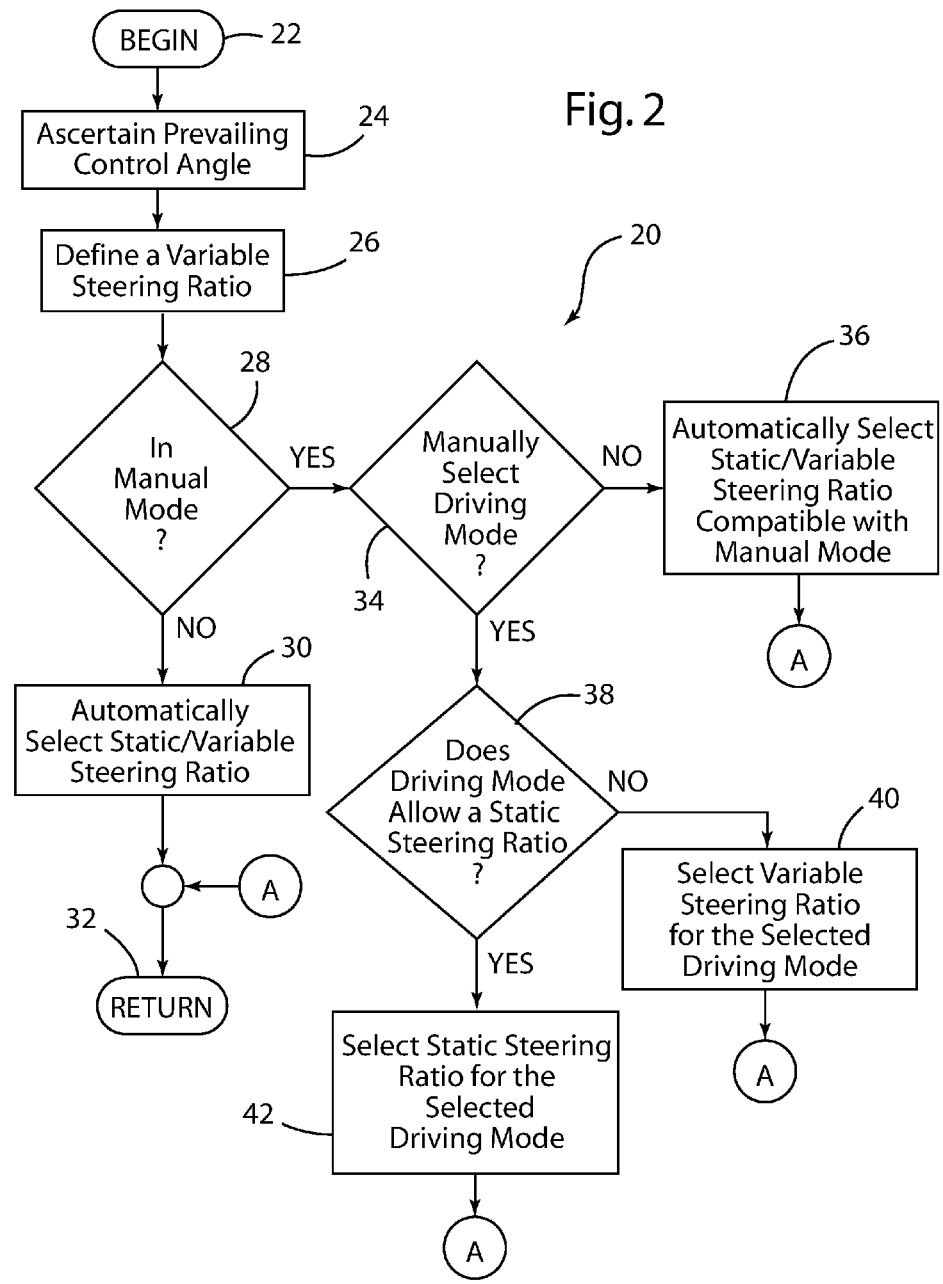

STEERING SYSTEM FOR A MOTOR VEHICLE AND METHOD FOR OPERATING SAME

BACKGROUND OF THE INVENTION

1. Field of the Invention

The invention relates to a steering system for a motor vehicle. More particularly, the invention relates to an actively adjustable steering system for a motor vehicle.

2. Description of Related Art

Motor vehicle steering systems may include an electronic steering system and an adjusting device controlled in an electrical manner by way of the electronic steering system. The adjusting device configured to set a steering angle of a steerable wheel of the motor vehicle. The electronic steering system includes a variable steering ratio between the control angle and the steering angle. A manually actuating device arranged within a passenger compartment of the motor vehicle and electrically connected to the electronic steering system enables a driver to manually select between at least two variable steering ratios. The electronic steering system controls the adjusting device as a function of a selected variable steering ratio.

SUMMARY OF THE INVENTION

A method of operating a steering system of a motor vehicle having a steerable wheel controlled using a steering wheel. The method including ascertaining a prevailing control angle of the steering wheel of the motor vehicle and defining variable steering ratio between the prevailing control angle and a steering angle of the steerable wheel. Detecting if the steering system is in a manual mode, if so enabling selection of a static steering ratio to set the steering angle of the steerable wheel.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a flow chart of one embodiment of the inventive method.

DETAILED DESCRIPTION OF THE PREFERRED EMBODIMENTS

Figure 1:
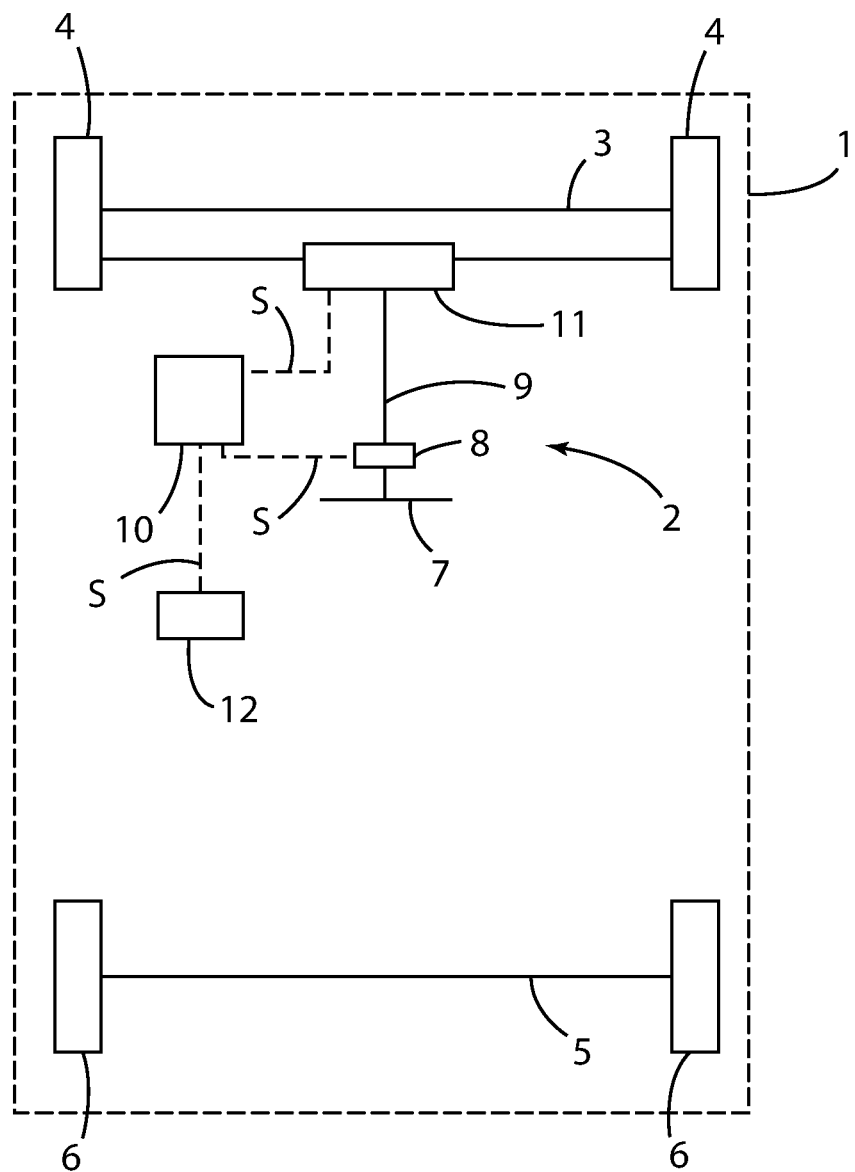
FIG. 1 is a schematic drawing of one embodiment of the invention for a motor vehicle.

The following description of the preferred embodiment(s) is merely exemplary in nature and is in no way intended to limit the invention, its application, or uses.

FIG. 1 schematically illustrates an exemplary embodiment of a motor vehicle 1 according to the invention. The motor vehicle 1 includes a steering system 2. The motor vehicle 1 includes two steerable front wheels 4 arranged on either end of a front axle 3 and two non-steerable rear wheels 6 arranged on either end of a rear axle 5. One or the other of the axles 3, 5 may have a singular wheel that operates therefrom. If it is the front axle 3, the motor vehicle 1 will only have one steerable wheel.

The steering system 2 includes a steering wheel 7 and a sensor 8 configured to ascertain a prevailing control angle of the steering wheel 7. The steering system 2 generates control angle signals corresponding to the ascertained prevailing control angles of the steering wheel 7. The sensor 8 arranged on a steering rod 9 and mounted in such a manner it rotates about its longitudinal center axis. The sensor 8 connected to the steering wheel 7 such that there is no lost motion between the steering wheel 7 and the steering rod 9. The sensor 8 may be a rotation sensor.

The steering system 2 includes an electronic steering system 10 connected to the sensor 8 via a signal line S. The electronic steering system 10 configured to receive and process the control angle signals as they are transmitted through the signal line S. The electronic steering system 10 defines a variable steering ratio between the control angle and the steering angle. As the control and steering angles vary, the electronic steering system 10 defines more than one variable steering ratio. The electronic steering system 10 may be arranged separately, or it may be integrated into an existing vehicle electronic system. The electronic steering system 10 may be connected by wire or in a wireless manner to the sensor 8.

The electronic steering system 10 may include an electronic storage device in which at least one dependency of the steering angle of the control angle (e.g., a mathematical function) can be stored to achieve the variable steering ratio. The electronic steering system 10 may include a microcontroller with which it is possible to implement at least one algorithm for performing the functions of the electronic steering system 10.

An adjusting device 11 is controlled by the electronic steering system 10. The adjusting device 11 sets a steering angle of the steerable front wheels 4. The adjusting device 11 is connected to the electronic steering system 10 by way of the signal line S. The adjusting device 11 may be controlled in an electrical manner by way of the electronic steering system 10 using electrically motorized, hydraulic, or pneumatic devices. The adjusting device 11 may set a steering angle of two or more steerable wheels 4 of the motor vehicle 1 arranged in particular on a single axle, preferably the front axle 3 of the motor vehicle 1.

In a passenger compartment (not shown), the steering system 2 also includes an actuating device 12 that can be manually actuated by the driver of the motor vehicle 1. This is a step of the inventive method 20, which will be discussed subsequently in greater detail.

The actuating device 12 is connected to the electronic steering system 10 by way of the signal line S. The actuating device 12 may be a switch, a lever, a touch screen, or the like. It is possible for a driver of the motor vehicle to select one or more static steering ratios by way of manually actuating the actuating device. The static steering ratios either preset or selected from the variable steering ratio. Consequently, it is possible for the driver to select an intuitive static steering ratio comfortable for the driver. It is difficult for the driver of the motor vehicle 1 to predict in advance the extent of a variation of a variable steering ratio during a driving operation of the motor vehicle 1. The system and method avoids any surprise to the driver by a variation of the steering ratio, which leaves the driver feeling insecure and to steering actions not optimal for the respective driving operation of the motor vehicle.

The driving characteristics of the motor vehicle 1 dependent upon the steering are more easily predicted and estimated for a driver of a motor vehicle when there is no variation of the steering ratio or if a static steering ratio is used to steer the motor vehicle. A static steering ratio can be freely selected by the driver of the motor vehicle 1. Consequently, the steering of the motor vehicle 1 is optimized for the driver of the motor vehicle 1 using the steering system 2.

Referring to FIG. 2, one embodiment 20 of the inventive method is shown. The method 20 begins at 22. The prevailing control angle of the steering wheel 7 is ascertained at 24. A variable steering ratio, discussed above, is defined at 26 based in part on vehicle speed and operating conditions.

It is then determined whether the system is in manual mode at 28. If the system is not in manual mode, the electronic steering system 10 automatically selects a predetermined static/variable steering ratio at 30. The desired steering ratio, whether static or dynamic, is selected from predetermined varying steering ratios being measured in real time. The electronic steering system 10 controls the adjusting device 11 based on the selected steering ratio. The method 20 then returns at 32.

If the system is in manual mode, it is determined at 34 whether a driving mode is manually selected. If not, the system automatically selects a variable steering ratio from predetermined values associated with the manual mode at 36 and the method 20 returns at 32. The electronic steering system 10 is configured to select a driving mode of the motor vehicle 1 from at least two predetermined driving modes during a manual actuation of the actuating device 12 and to control the adjusting device 11 based on selection of the manual driving mode. One of the driving modes is merely selecting a static steering ratio.

If a particular driving mode is manually selected at step 34, it is determined whether the selected driving mode allows for a static steering ratio at 38. If the driving mode selected does not allow for a static steering ratio, a variable steering ratio compatible with the selected driving mode is selected at 40. The electronic steering system 10 may be configured to select a driving mode of the motor vehicle 1 from a plurality of predetermined driving modes during a manual actuation of the actuating device 12 and to control the adjusting device 11 based on the selected driving mode. Each driving mode option is allocated a variable steering ratio.

If it is determined at 38 that a static steering ratio is allowed based on the driving mode, and such a static steering ratio is desired, it is selected at 42. The static steering ratio selected must be compatible with the drive mode selected.

Examples of driving modes include, but are not limited to a power-optimized driving mode, a consumption-optimized driving mode, a driving mode optimized in relation to the respective surface being driven on (a terrain mode or the like). The driver of the motor vehicle can select the driving mode by way of the driving mode selection and the driving mode is allocated a static steering ratio. Two or more driving modes can also be allocated in each case including multiple static steering ratios, wherein the static steering ratios differ from one another. In addition, a driver may select a variable steering ratio compatible with the selected driving mode.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A steering system for a motor vehicle, said steering system comprising:
   a sensor to measure a prevailing control angle of a steering wheel of the motor vehicle and to generate a control angle signal that correspond to the prevailing control angle of the steering wheel;
   an electronic steering system connectable to the sensor device using signal technology, said electronic steering system receiving and processing the control angle signal;
   an adjusting device electrically connected to and controlled by said electronic steering system, said adjusting device setting a steering angle of a steerable wheel of the motor vehicle; and
   an actuating device communicating with said electronic steering system using signal technology, wherein said electronic steering system defines at least one variable steering ratio between the prevailing control angle and the steering angle and is configured to select a static steering ratio from the variable steering ratio during a manual actuation of said actuating device and to control said adjusting device based on the selected static steering ratio.

2. The steering system as set forth in claim 1 wherein said electronic steering system is configured to select a prevailing steering ratio as the static steering ratio during a manual actuation of the actuating device.

3. The steering system as set forth in claim 1 wherein the electronic steering system is configured to select a driving mode of the motor vehicle from a plurality of predetermined driving modes during a manual actuation of said actuating device and to control said adjusting device based upon the selected driving mode, wherein one of the plurality of predetermined driving modes includes an allocated static steering ratio.

4. The steering system as set forth in claim 3, wherein at least one of the plurality of predetermined driving modes includes a variable steering ratio.

5. A motor vehicle comprising:
   a front axle;
   a rear axle;
   a steerable front wheel operatively connected to said front axle;
   non-steerable rear wheels operatively connected to said rear axle;
   a steering system operatively connected to said steerable front wheels, said steering system including a steering wheel actuated by a driver of said motor vehicle, said steering system further including a sensor to measure a prevailing control angle of a steering wheel of the motor vehicle and to generate a control angle signal that correspond to the prevailing control angle of the steering wheel, an electronic steering system connectable to the sensor device using signal technology, said electronic steering system receiving and processing the control angle signal, an adjusting device electrically connected to and controlled by said electronic steering system, said adjusting device setting a steering angle of a steerable wheel of the motor vehicle; and an actuating device communicating with said electronic steering system using signal technology, wherein said electronic steering system defines at least one variable steering ratio between the prevailing control angle and the steering angle and is configured to select a static steering ratio from the variable steering ratio during a manual actuation of said actuating device and to control said adjusting device based on the selected static steering ratio.

6. A method for operating a steering system of a motor vehicle having a steerable wheel controlled using a steering wheel comprising the steps of: using a sensor to ascertain a prevailing control angle of the steering wheel; providing an electronic steering system for defining a variable steering ratio between the prevailing control angle and a steering angle of the steerable wheel; providing an actuating device for selecting a static steering ratio from the variable steering ratio to set the steering angle of the steerable wheel.

7. The method as set forth in claim 6 wherein the step of selecting the static steering ratio is manually actuated.

8. The method as set forth in claim 6 wherein a prevailing steering ratio is selected as a static steering ratio during the manual actuation of the actuating device.

9. The method as set forth in claim 8 including the step of selecting a driving mode of the motor vehicle from a plurality of predetermined driving modes.

10. The method as set forth in claim 9, wherein the step of choosing one driving mode is manually actuated.

11. The method as set forth in claim 10 wherein one of the plurality of predetermined driving modes is allocated a static steering ratio.

12. The method as set forth in claim 9 wherein the steering angle of the steerable wheel is set based on the driving mode selected.

13. The method as claimed in claim 11, wherein another of the plurality of predetermined driving modes includes a variable steering ratio.

\* \* \* \* \*